United States Patent
Snyder

(10) Patent No.: US 6,647,979 B2
(45) Date of Patent: Nov. 18, 2003

(54) SOLAR-POWERED WATER HEATING SYSTEM

(75) Inventor: Darryl L. Snyder, Canton, OH (US)

(73) Assignee: Snyder National Corporation, Canton, OH (US)

( * ) Notice: Subject to any disclaimer, the term of this patent is extended or adjusted under 35 U.S.C. 154(b) by 13 days.

(21) Appl. No.: 10/164,889

(22) Filed: Jun. 6, 2002

(65) Prior Publication Data

US 2002/0185123 A1 Dec. 12, 2002

Related U.S. Application Data

(60) Provisional application No. 60/297,128, filed on Jun. 8, 2001.

(51) Int. Cl.$^7$ .............................. E04D 13/18; F24J 2/24
(52) U.S. Cl. ...................... 126/621; 126/622; 126/651; 126/704; 165/171
(58) Field of Search ................ 126/621, 622, 126/623, 704, 706, 634, 651, 652, 663; 165/170, 171, 48.2, 49, 169

(56) References Cited

U.S. PATENT DOCUMENTS

| | | |
|---|---|---|
| 4,083,360 A | 4/1978 | Courvoisier et al. |
| 4,098,260 A | 7/1978 | Goettl |
| 4,136,669 A | 1/1979 | Lane |
| 4,146,014 A | 3/1979 | Allegro |
| 4,164,933 A | 8/1979 | Alosi |
| 4,178,912 A * | 12/1979 | Felter .................. 126/621 |
| 4,194,498 A | 3/1980 | Mayerovitch |
| 4,197,834 A | 4/1980 | Nevins |
| 4,244,355 A | 1/1981 | Stout |
| 4,244,356 A | 1/1981 | Barrett |
| 4,271,818 A * | 6/1981 | Hastwell .............. 126/621 |
| 4,304,220 A | 12/1981 | Brockhaus |
| 4,396,009 A | 8/1983 | Enga |
| 4,404,960 A * | 9/1983 | Laing .................. 126/622 |
| 4,422,443 A | 12/1983 | Arendt |
| 4,702,227 A | 10/1987 | McElwain |
| 5,509,246 A | 4/1996 | Roddy |
| 6,182,403 B1 | 2/2001 | Mimura et al. |
| 6,196,216 B1 | 3/2001 | Kooij |

FOREIGN PATENT DOCUMENTS

DE 3934719 * 4/1991 .............. 126/622

* cited by examiner

Primary Examiner—James C. Yeung
(74) Attorney, Agent, or Firm—Sand & Sebolt

(57) ABSTRACT

A solar-powered water heating system provides heated water to a pool in an aesthetically-pleasing, leak-resistant manner. The invention provides a heat gathering unit disposed in a tray that fits within the deck boards of a typical roof. Shingles are disposed over the heat gathering unit and any leaks that occur within the heat gathering unit flow out over the top of the shingles. A drain conduit is provided below supply and return pipes so that any leaks flowing out of the supply and return pipes and their connections with the heat gathering unit will be directed out of the building structure to a location where the leak may be readily detected.

25 Claims, 15 Drawing Sheets

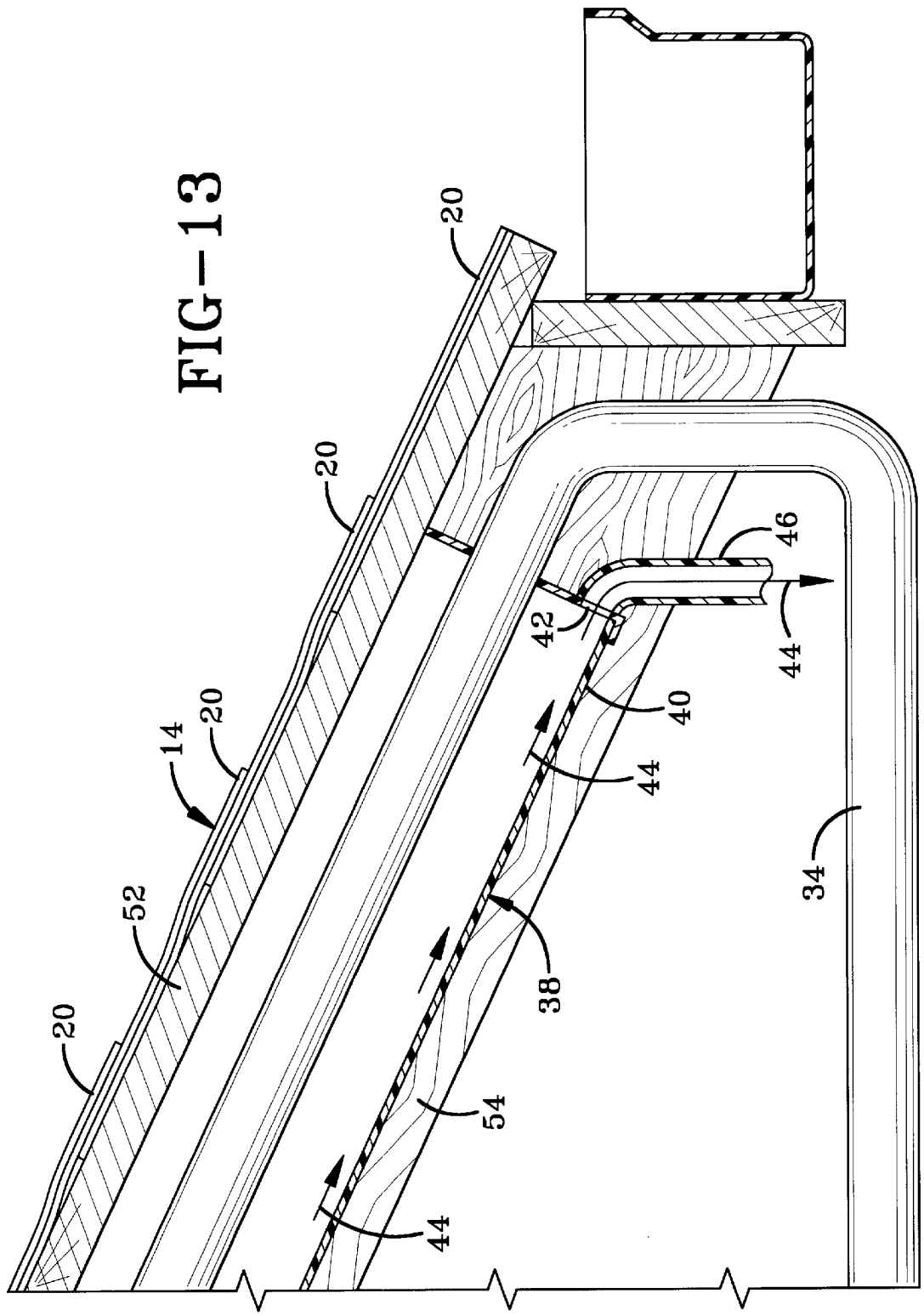

SOLAR-POWERED WATER HEATING SYSTEM

CROSS-REFERENCE TO RELATED APPLICATIONS

This application claims priority from U.S. Provisional Patent Application Ser. No. 60/297,128 filed Jun. 8, 2001; the disclosures of which are incorporated herein by reference.

BACKGROUND OF THE INVENTION

1. Technical Field

The present invention generally relates to water heating systems and, more particularly, a solar-powered water heating system. Specifically, the present invention relates to a solar-powered water heating system that may be installed under the shingles of a typical roof.

2. Background Information

The high cost of energy is increasing the demand for solar-powered water heaters for use with swimming pools. As those who have paid swimming pool heating bills know, the cost of heating a large body of water to a comfortable swimming temperature is extremely expensive without help from the sun. Swimming pool owners thus desire efficient solar-powered water heaters that can be retrofit into existing building structures without detracting from the aesthetics of the building structure.

The swimming pool owner is often reluctant to install a system that runs water onto his roof in fear of leaks that create expensive repairs. Any system that is mounted on a roof or wall of a dwelling or other building must include safeguards against leaks and indicators that warn the owner when leaks are occurring. Another problem with the prior art systems is that they are installed over the shingles of a roof and can injure the shingles or at least detract from the appearance of the building. Homeowners desire a solar-powered water heating system that is disposed below the shingles of the roof while not requiring major structural changes to the roof for the system to be installed.

BRIEF SUMMARY OF THE INVENTION

In view of the foregoing, the system of the invention provides a solar-powered water heating system that provides heated water to a pool in an aesthetically-pleasing, leak-resistant manner. The invention provides a heat gathering unit disposed in a tray that fits within the deck boards of a typical roof. Shingles are disposed over the heat gathering unit and any leaks that occur within the heat gathering unit flow out over the top of the shingles. A drain conduit is provided below supply and return pipes so that any leaks flowing out of the supply and return pipes and their connections with the heat gathering unit will be directed out of the building structure to a location where the leak may be readily detected.

The entire system fits within existing roof structures and below the roof covering so that the system does not detract from the aesthetics of the building.

BRIEF DESCRIPTION OF THE SEVERAL VIEWS OF THE DRAWINGS

FIG. 13 is a section view of the end of the drain conduit.

Similar numbers refer to similar parts throughout the specification.

DETAILED DESCRIPTION OF THE INVENTION

Figure 1:
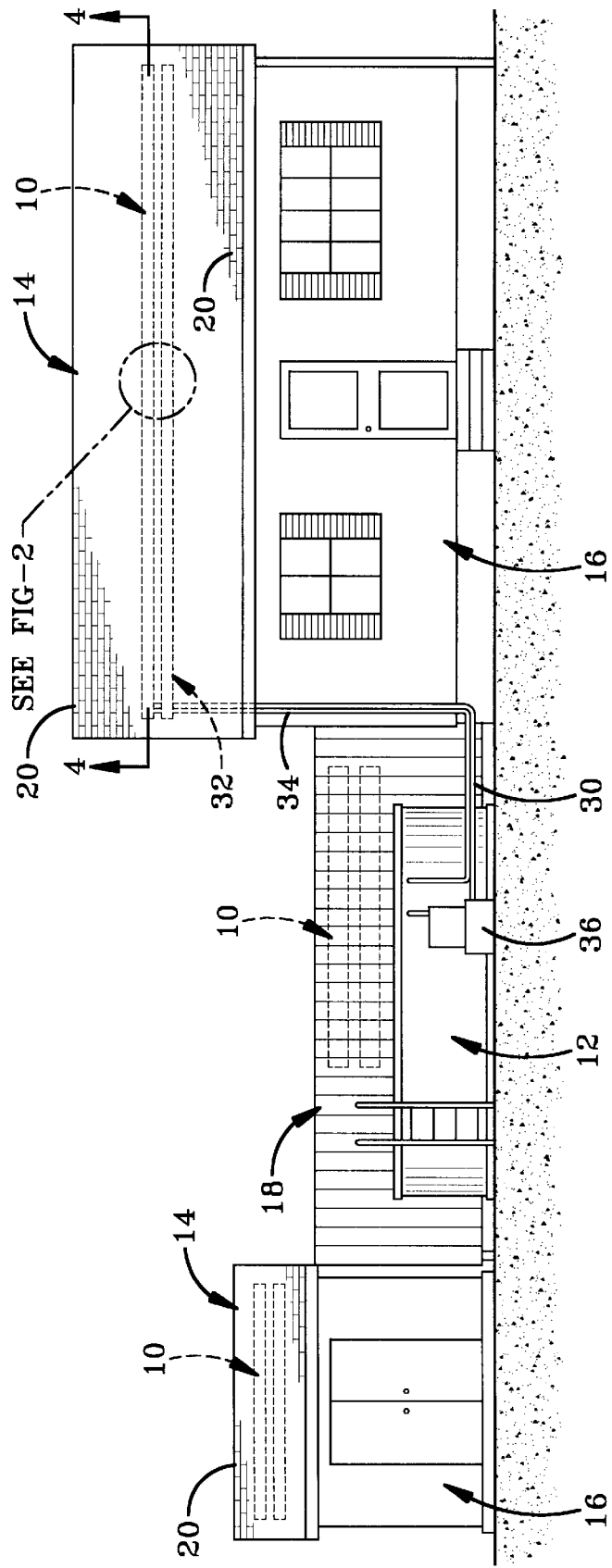
FIG. 1 is a front elevation view of a house, a pool house, a fence, and a pool used with the solar-powered water heating system of the present invention.

The solar-powered water heating system of the present invention is indicated generally by the numeral 10 in the accompanying drawing figures. System 10 may be used to provide heated water to a pool 12 such as the above-the-ground depicted in FIG. 1 or an in-ground pool. System 10 may be carried by the roof 14 of a building 16 such as a residential dwelling or a pool house or shed 16 as depicted in FIG. 1. System 10 may also be mounted in a fence 18. System 10 functions by warming water pumped through system 10 with energy from the sun.

Although system 10 may be carried by roof 14 or fence 18 or a variety of other structures known to those skilled in the art, the exemplary embodiment described herein and shown in the drawings describes system 10 mounted in roof 14. System 10 may also be mounted on a vertical wall of building 16. One advantage of system 10 is that the elements of system 10 mounted in roof 14 are mounted under the shingles 20 or other types of roof covering members so that system 10 does not detract from the aesthetics of house 16.

System 10 generally includes a primary supply pipe 30, at least one heat gathering unit 32, and a primary return pipe 34. A pump 36 is connected to primary supply pipe 30 or primary return pipe 34 to move the water through system 10. Water from pool 12 is delivered to heat gathering unit 32 by pump 36 where the water is moved back and forth across roof 14 where it is warmed by solar energy. The heated water is returned to pool 12 by primary return pipe 34. System 10 thus provides warm water to pool 12 while only using the energy to run pump 36.

Figure 3:
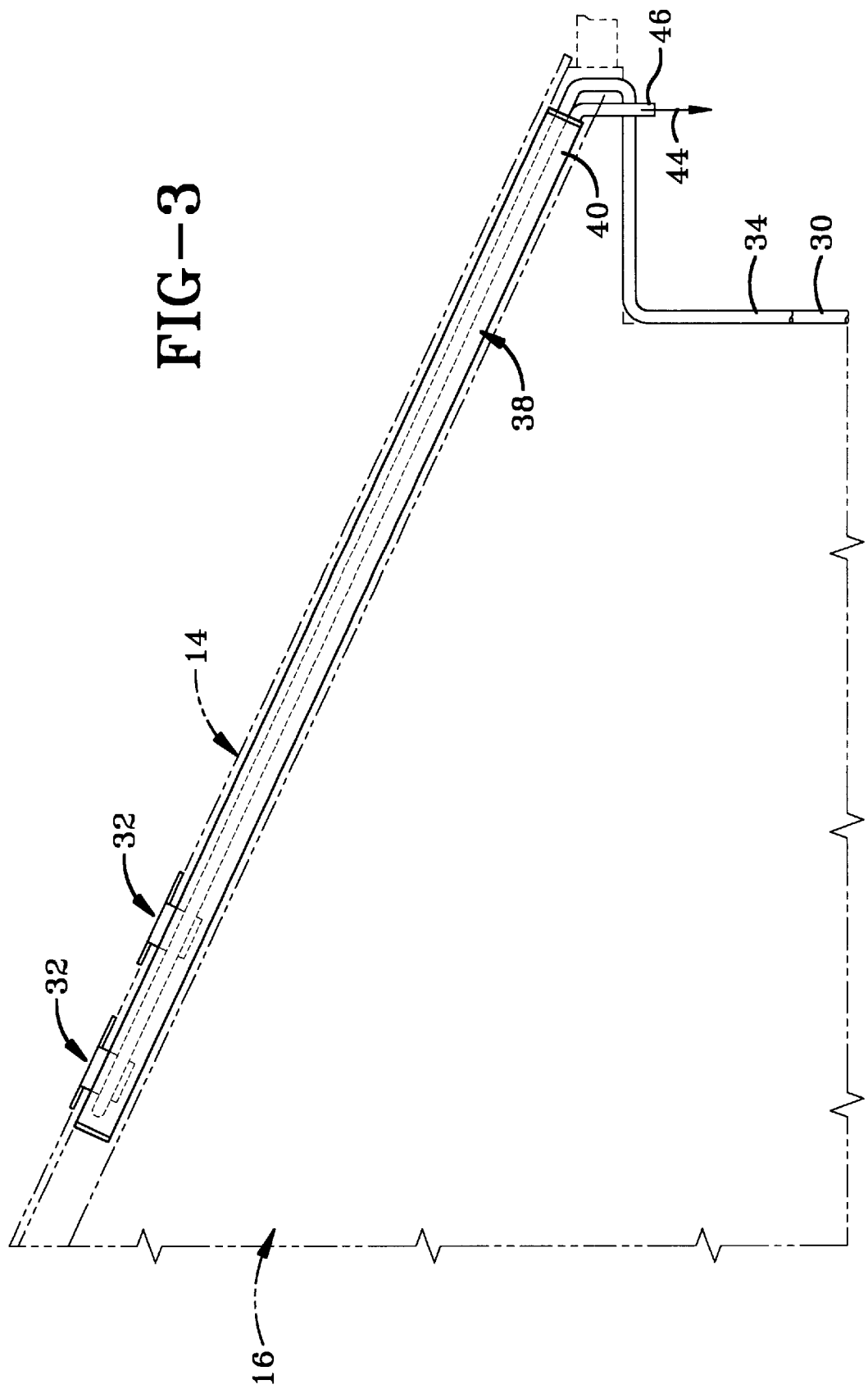
FIG. 3 is an end view of the roof-mounted portion of the system of FIG. 1.

Primary supply pipe 30 and primary return pipe 34 may be positioned along the outside of building 16 as shown in FIGS. 1, 3, and 13. In other embodiments of the invention, pipes 30 and 34 may be run inside of the outer structural perimeter of building 16 so that they are hidden from view. In still other embodiments, a down spout may be used to hide pipes 30 and 34.

System 10 is designed to be installed in existing roofs 14 below shingles 20 where the elements of system 10 cannot be seen and do not detract from the aesthetics of building 16.

Another advantage of system 10 is that system 10 includes various elements that guard against leaks that may occur over the life of system 10. The owner of dwelling 16 is naturally very concerned about running water inside of his roof 14 and will not install system 10 unless there are numerous safeguards against a burst pipe or a slow leak.

One of these safeguards is that pipes 30 and 34 are disposed in a primary drain conduit 38 when they enter roof 14 as depicted in FIGS. 3 and 13. Primary drain conduit 38 is fabricated from a waterproof material that directs any leaks from heat gathering units 32, primary supply pipe 30, or primary return pipe 34 down to a lower end 40 that extends out beyond the outer wall of building 16. Lower end 40 defines an opening 42 that allows any water 44 disposed in primary drain conduit 38 to slowly drip out of primary drain conduit 38 to provide a visual indication to the home owner that there is a leak in system 10. The dripping water will not damage building 16 because of the extended location of lower end 40 of primary drain conduit 38. A drip pipe 46 may be provided to direct water 44 away from building 16. Pipe 46 may be positioned in a location where water 44 may be readily detected by the owner of building 16. In another embodiment, a sensor may be disposed in pipe 46 to create a warning signal.

Figures 4, 4A:
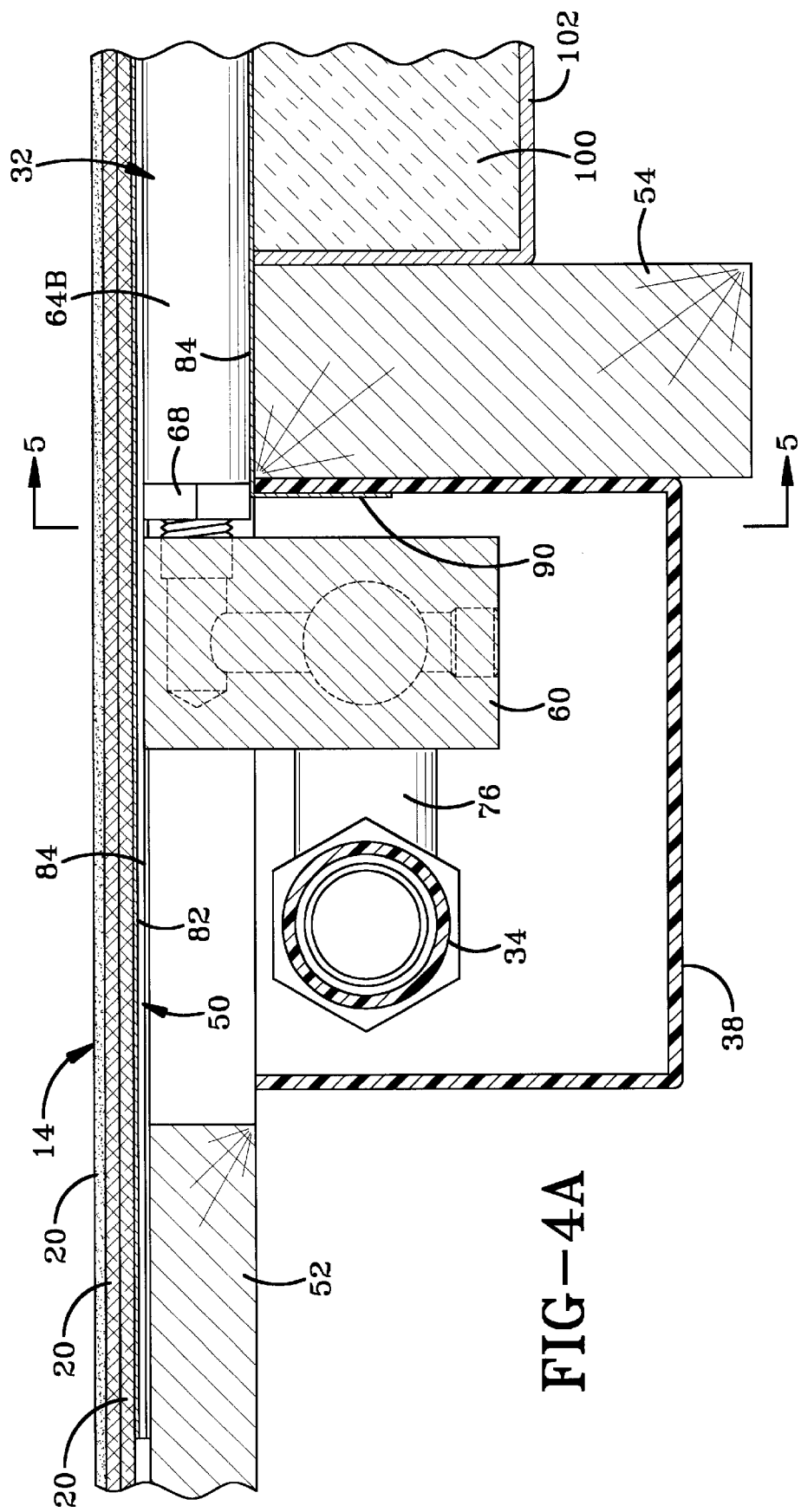
FIG. 4 is a section view taken along line 4—4 of FIG. 1 including FIGS. 4A, 4B, and 4C.
Figure 4B:
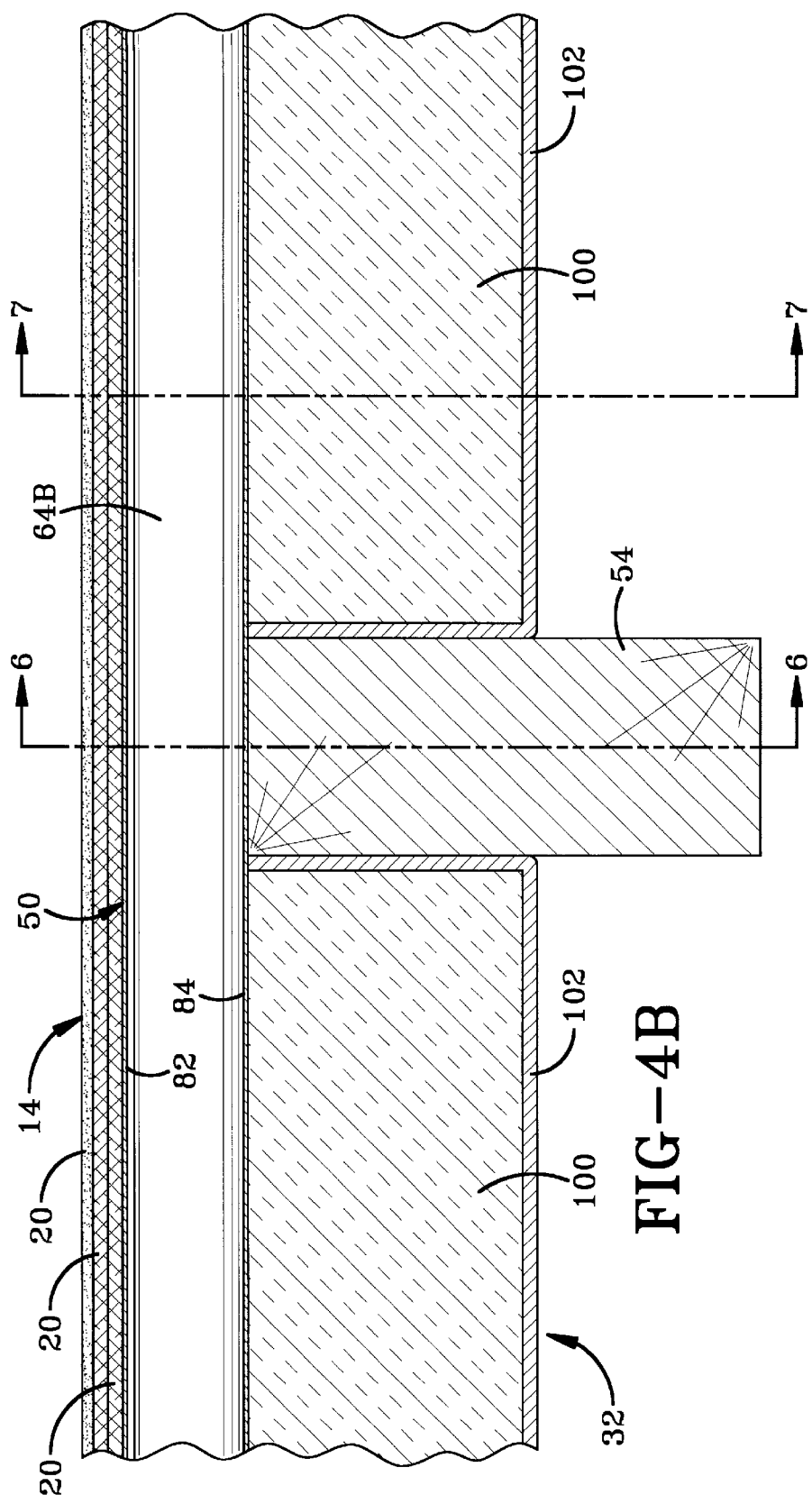
Figure 4C:
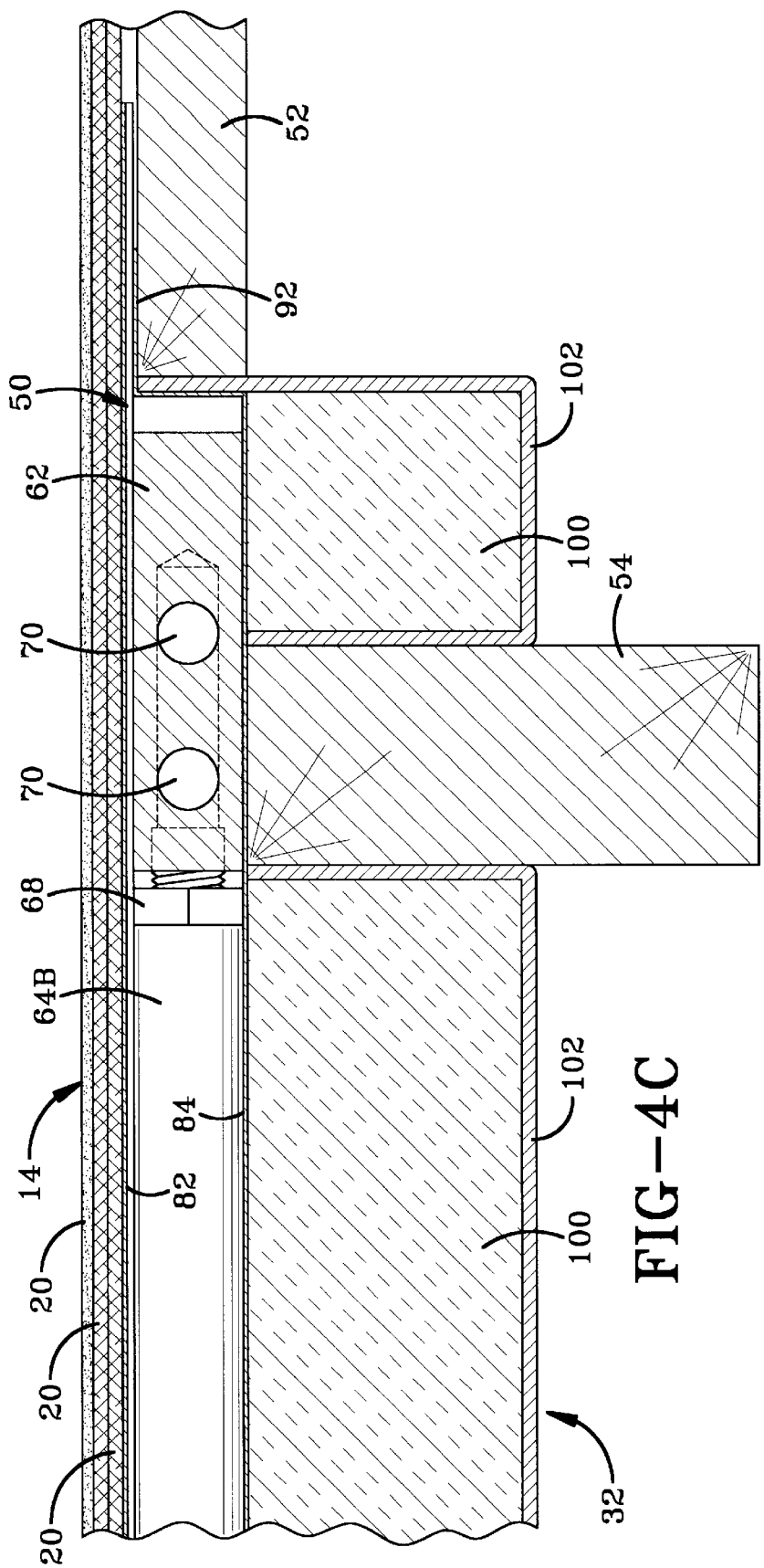

Primary drain conduit 38 includes three integrally formed sides as depicted in FIG. 4A and an open top that allows heat gathering units 32 to be positioned along the length of primary drain conduit 38 as needed. System 10 includes at least one heat gathering unit 32 but may include a plurality of units 32 in order to increase the capacity of system 10. In the embodiment of the invention depicted in the drawings, system 10 includes a pair of heat gathering units 32 disposed along conduit 38.

Each heat gathering unit 32 includes a tray 50 that holds the elements of heat gathering unit 32 in a manner that prevents leaks from entering building 16 while allowing any leaks to be readily detected. Tray 50 is also configured to function with existing roof structures and shingle coverings. The structure of tray 50 allows system 10 to be retrofit into most existing roofs when the roof is re-shingled without requiring major structural changes to roof 14.

Tray 50 is supported by roof 14 and is positioned substantially within the deck boards 52 while being supported from below by joists 54. Tray 50 thus has a depth just slightly greater than the thickness of deck board 52. In the preferred embodiment, deck board 52 is ¾ inch board and the lower surface of tray 50 is flush with the lower surface of deck board 52. Portions of tray 50 rest on top of boards 52. Openings sized to accommodate tray 50 must be cut into deck boards 52 when system 10 is installed.

Figure 12:
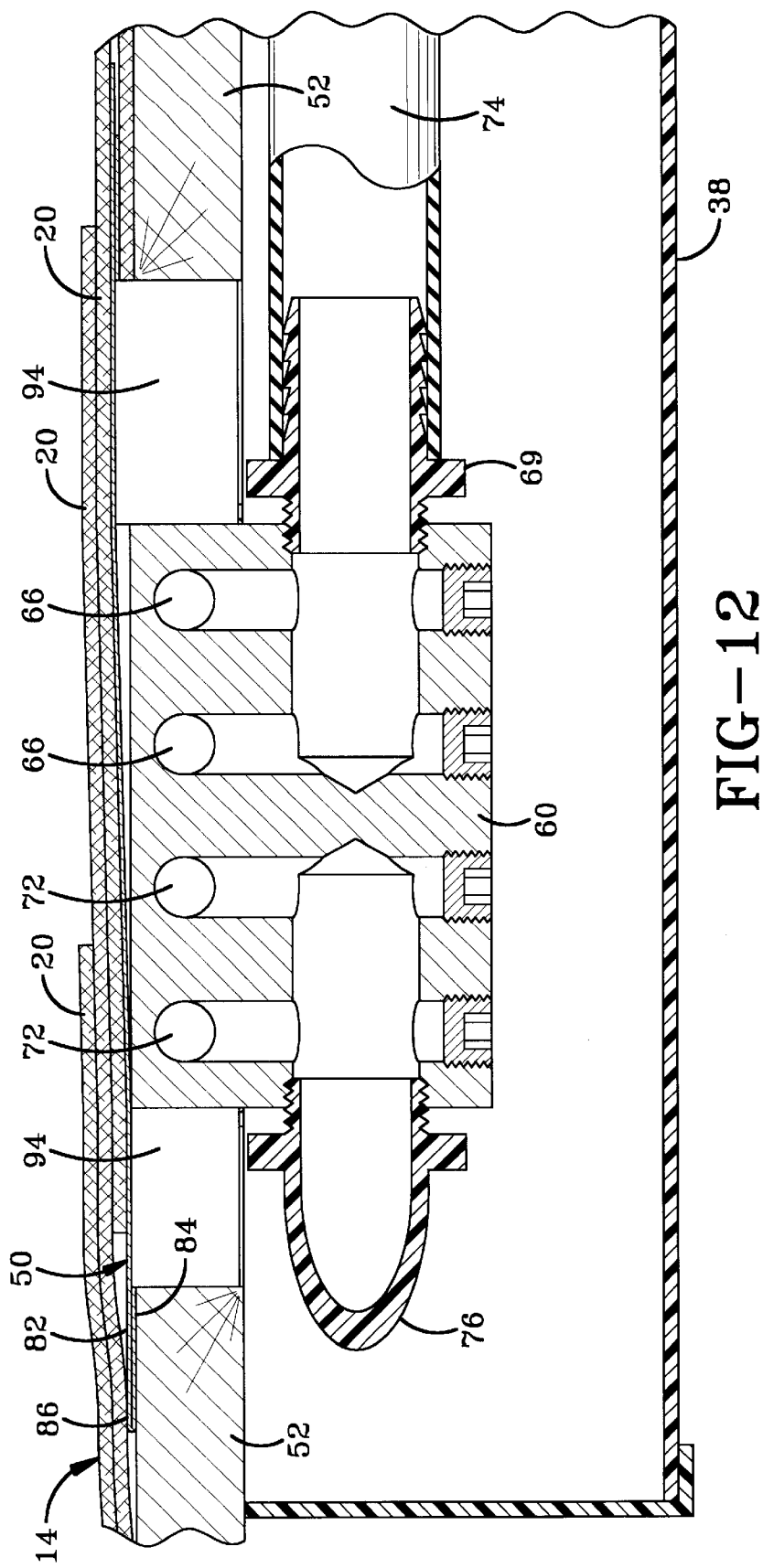
FIG. 12 is a section view taken along line 12—12 of FIG. 11.

Each heat gathering unit 32 includes an inlet block 60, a return block 62, and a plurality of conduits 64 disposed between blocks 60 and 62. Inlet block 60 is connected to primary supply pipe 30 and distributes water from primary supply pipe 30 to at least one, but preferably two, conduits 64 disposed in tray 50. Water from primary supply pipe 30 enters inlet block 60 and is distributed to two inlet ports 66 that are in fluid communication with inlet conduit 64A. Inlet conduit 64A may be connected to inlet block 60 by a variety of conventional connectors such as the nipples 68 depicted in the drawings. Each nipple 68 may be threaded into let block 60 with a fluid tight threaded connection. A plurality of ribs engage the inner surface of conduit 64A to prevent conduit 64A from pulling off of nipple 68 and to prevent leaking. Each nipple 68 may include a flange against which conduit 64A abuts. In other embodiments of the invention, conduit 64A may be connected directly to inlet block 60 in a manner known to those skilled in the art. In still other embodiments of the invention, different types of connectors 68 may be used without departing from the concepts of the present invention. As depicted in FIG. 12, an inlet nipple 69 is used to connect primary supply pipe 30 to inlet block 60. As described above with respect to connectors 68, other connectors 69 with structures other than that depicted in FIG. 12 may be used without departing from the concepts of the present invention.

Water is thus delivered to inlet conduits 64A through ports 66 from primary supply pipe 30. Inlet conduits 64A extend across roof 14 a distance sufficient to allow the water in inlet conduits 64A to be warmed by the sun. The exact distance may be adjusted based on the desired capacity of system 10.

Figure 10:
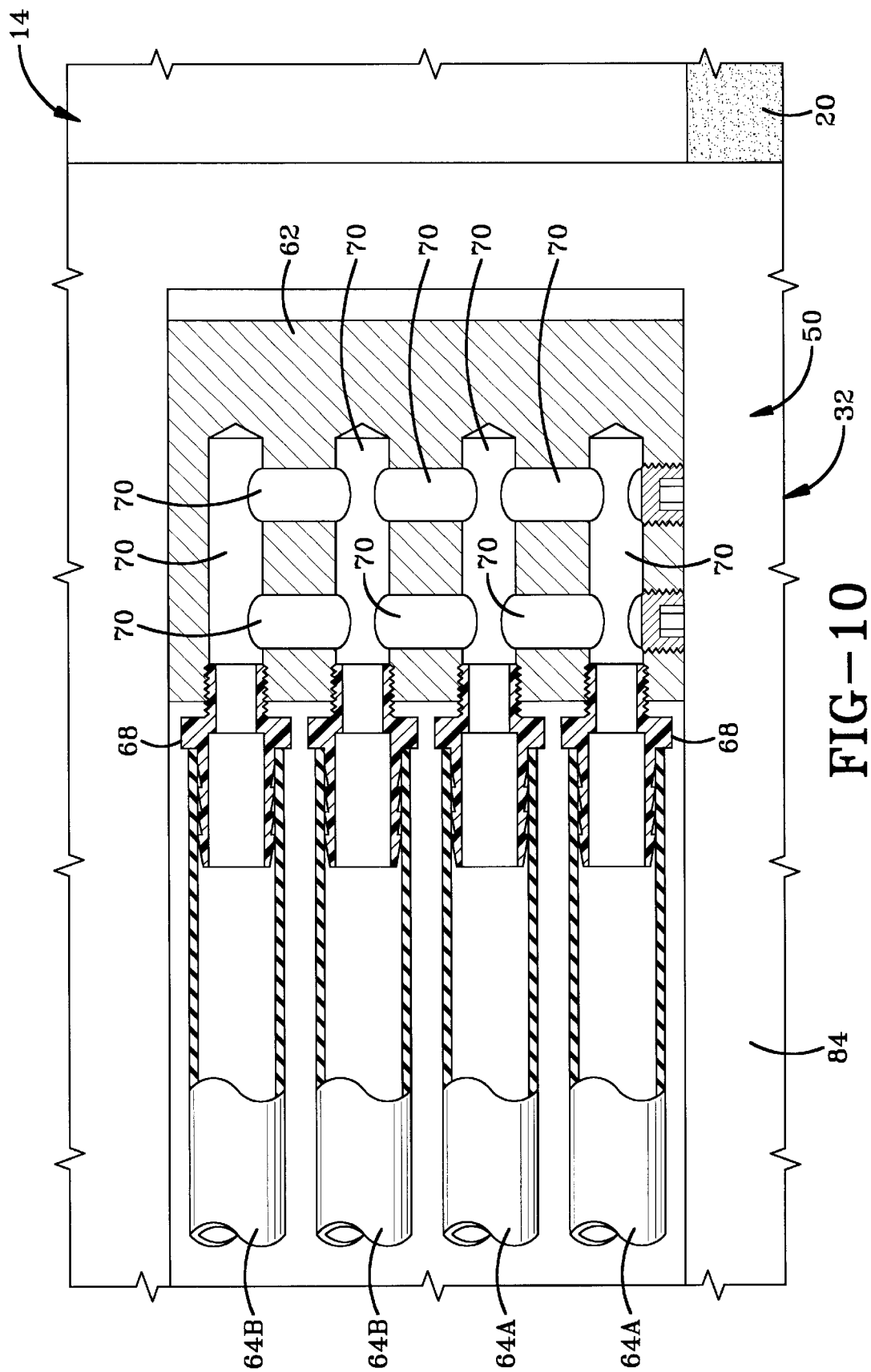
FIG. 10 is a section view of the return block.
Figure 11:
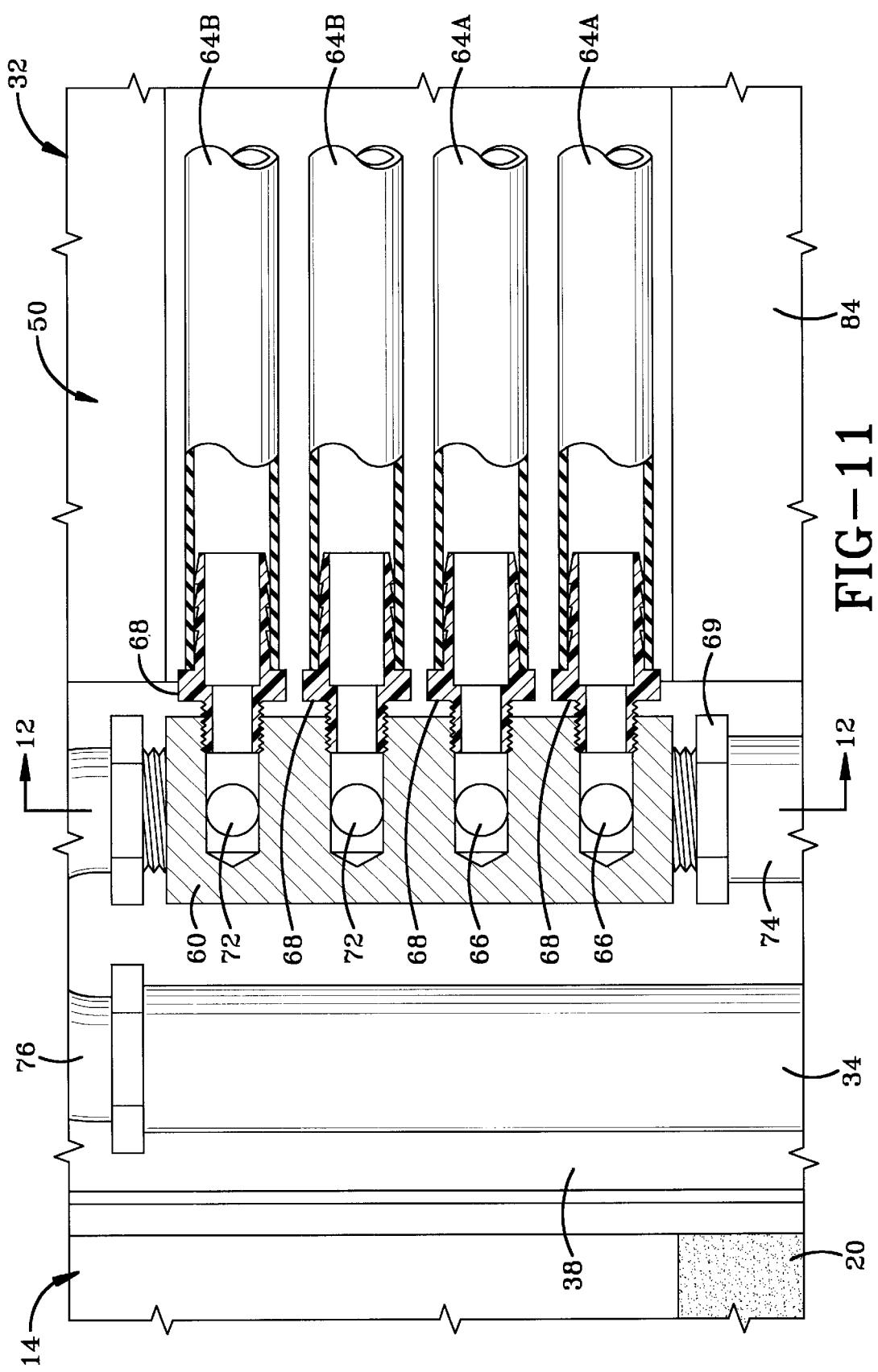
FIG. 11 is a section view of the inlet block.

Return block 62 functions to redirect water from inlet conduit 64A to return conduit 64B as depicted in FIG. 10. Connectors 68 similar to those described above are used to connect conduit 64 to block 62. Block 62 defines return passages 70 that provide fluid communication between conduit 64A and conduit 64B. Passages 70 may be laid out in the configuration depicted in FIG. 10 or each conduit 64A may have a separate passage with its corresponding conduit 64B if separation of the water between the conduits is desired. The passage pattern depicted in FIG. 10 allows the water to mix as it passes through return block 62.

Figure 9:
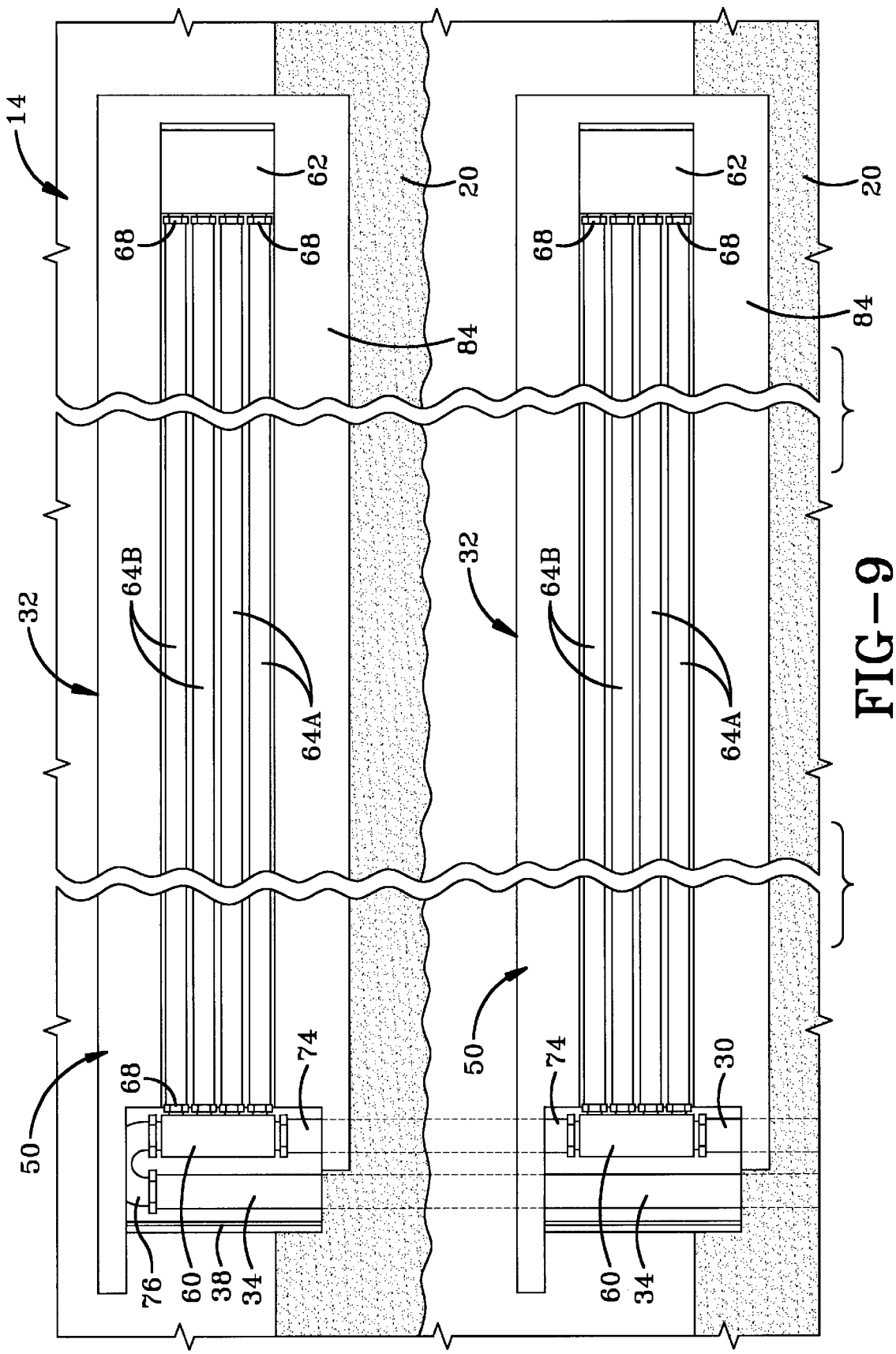
FIG. 9 is a view similar to FIG. 8 with the top portion of the tray removed.

After the water passes through return block 62, it travels back across roof 14 through return conduit 64B and arrives back at inlet block 60. The water from return conduit 64B is received in return port 72 and is delivered to a secondary portion 74 of primary supply pipe 30 which delivers the heated water to a second heat gathering unit 32. In the lower heat gathering unit 32 of FIG. 9, return port 72 provide fluid communication between secondary supply pipe 74 and return conduit 64B. In the upper heat gathering unit 32 of FIG. 9, return ports 72 provide fluid communication between return conduit 64B and a return tube 76 that directs the heated water to primary return pipe 34. All of the connections between these elements are designed to be leak proof and maintenance free. On the other hand, if a leak develops in any of these elements, the elements are positioned within primary drain conduit 38 so that any leaks will be directed outside of building 16 in a manner that provides an indication to the owner of building 16 that a leak has occurred.

Water from pool 12 is thus delivered to heat gathering units 32 by pump 36. The inventor notes that pump 36 may be positioned on primary supply pipe 30 to push water through system 10 or pump 36 may be positioned on primary return pipe 34 to pull water through system 10. Cold water is delivered to heat gathering units 32 by primary supply pipe 30 through inlet block 60. The water travels across roof 14 through inlet conduit 64A where the water is heated by solar heat. The water is re-directed by return block 62 and passes back across roof 14 through return conduit 64B. The heated water may then be returned to primary return tube 34 or may be directed to a second heat gathering unit by a secondary primary supply pipe 74 where the heating process is repeated. Heated water is returned to pool 12 by primary return pipe 34 and the process is repeated.

Heat gathering units 32 are preferably mounted in the roof 14 of a building 16. Building 16 may be a dwelling or a pool shed or house. Heat gathering units 32 may also be disposed within fence 18 and may function as the support rails of fence 18 if such support is desired. Those skilled in the art will recognize various other positions for heat gathering units 32 such as in the vertical walls of building 16. System 10 thus provides an efficient water-heating system that may be mounted in the structure of a building without requiring significant modifications to building 16. System 10 guards against leaks that could damage building 16 and provides indicators for identifying when leaks occur. One such leak indicator is opening 42 and tube 46 at lower end 40 of primary drain conduit 38. Another leak indicator is described in more detail below and is the structure and configuration of tray 50 with respect to roof 14 and shingles 20. This indicator causes leaking water to drain over the top of shingles 20 as indicated by numerals 80 in FIG. 2 when a leak occurs in tray 50. Water 80 can be viewed by the owner of building 16 by looking up at shingles 20 and leaking water 80 is positioned above shingles 20 so that it does not damage roof 14 of building 16.

Figure 2:
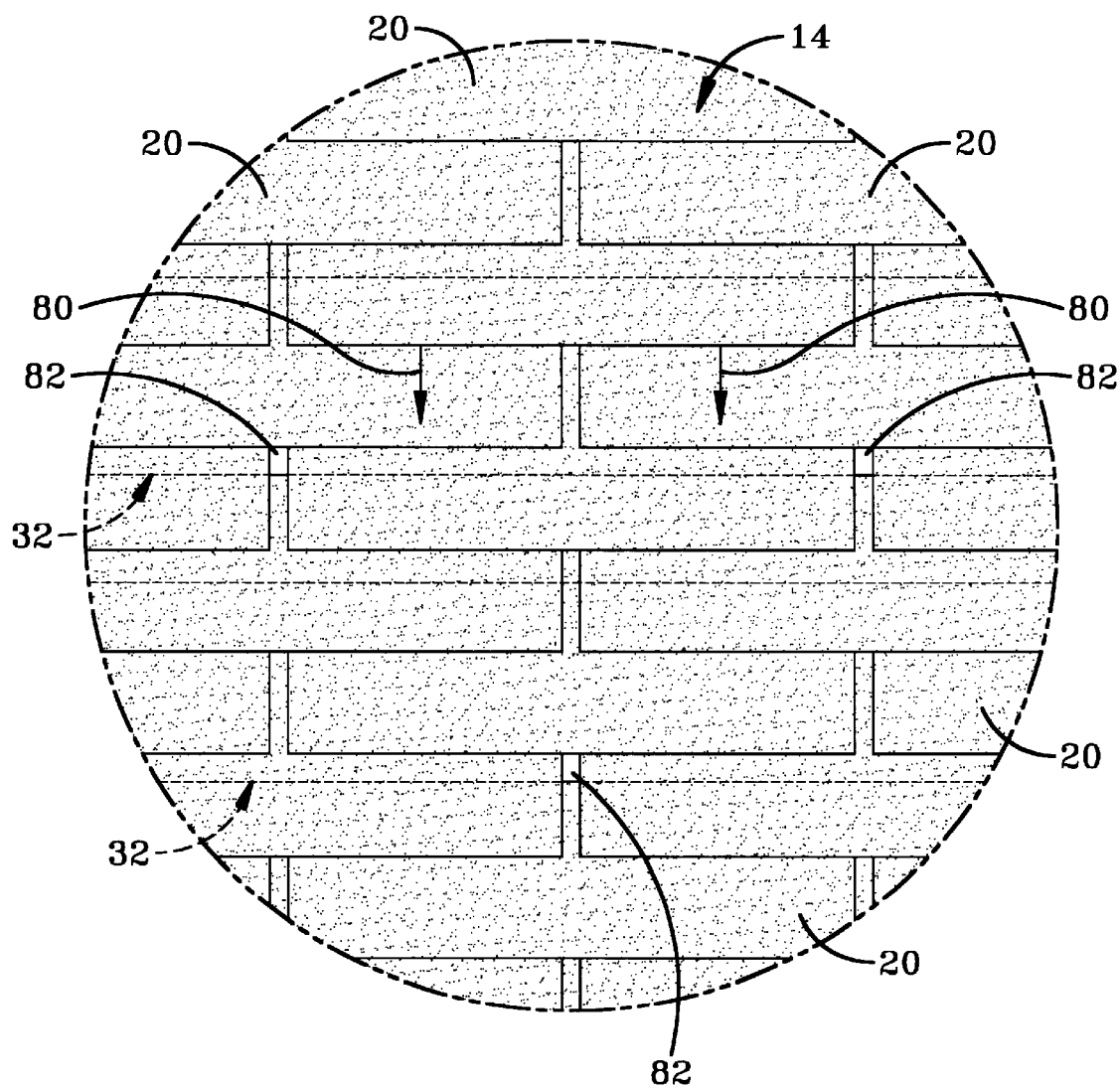
FIG. 2 is an enlarged view of the encircled portion of FIG. 1.
Figure 8:
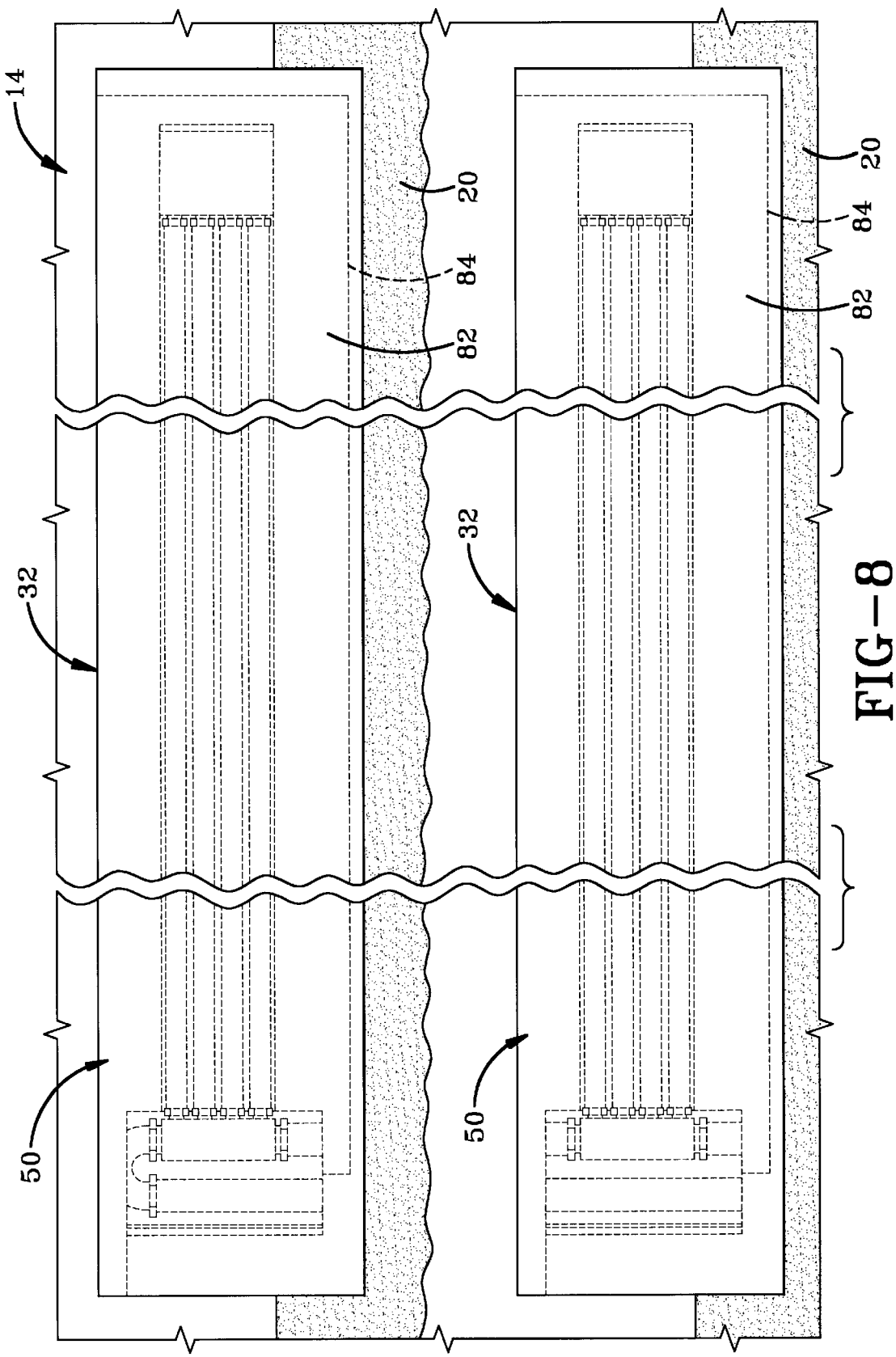
FIG. 8 is a top view of the heat gathering units of the solar-powered water heating system with the shingles removed.

Tray 50 that holds heat gathering unit 32 has a unique structure that allows it to be used with existing roofs 14 while preventing leaks that could damage roof 14. Tray 50 includes a top member 82 and a bottom member 84 that are connected together with a living hinge 86 that is formed by bending top member 82 with respect to bottom member 84. Any leaks in tray 50 will leak out over bottom member 84 onto the top of shingles 20. As depicted in FIG. 8, top member 82 is configured to extend beyond bottom member 84 so that top member 82 functions to prevent from entering heat gathering units 32. Top member 82 also provides some structural support to heat gathering unit 32 to prevent damage to heat gathering unit 32 if a person walks on heat gathering unit 32. To warn people against walking on heat gathering units 32, top member 82 has a length that extends beyond shingles as depicted in FIG. 2 so that a portion of top member 82 is visible between shingles 20. This visible portion allows a person walking on roof 14 to readily ascertain the position of heat gathering units 32 so that the person does not walk directly on heat gathering units 32 and so that the location of heat gathering units 32 may be determined for repairs or maintenance.

Figure 5:
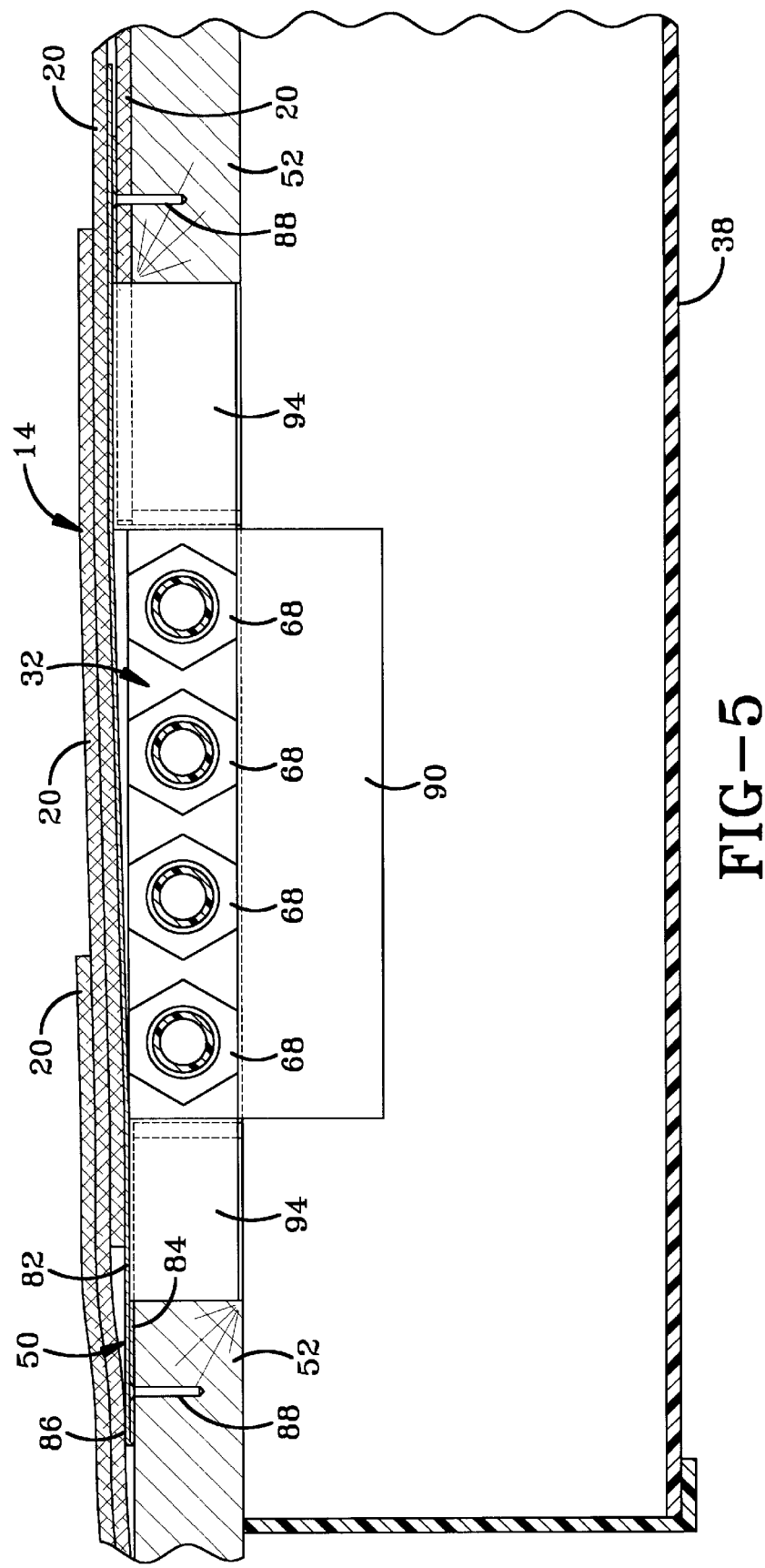
FIG. 5 is a section view taken along line 5—5 of FIG. 4A.
Figure 6:
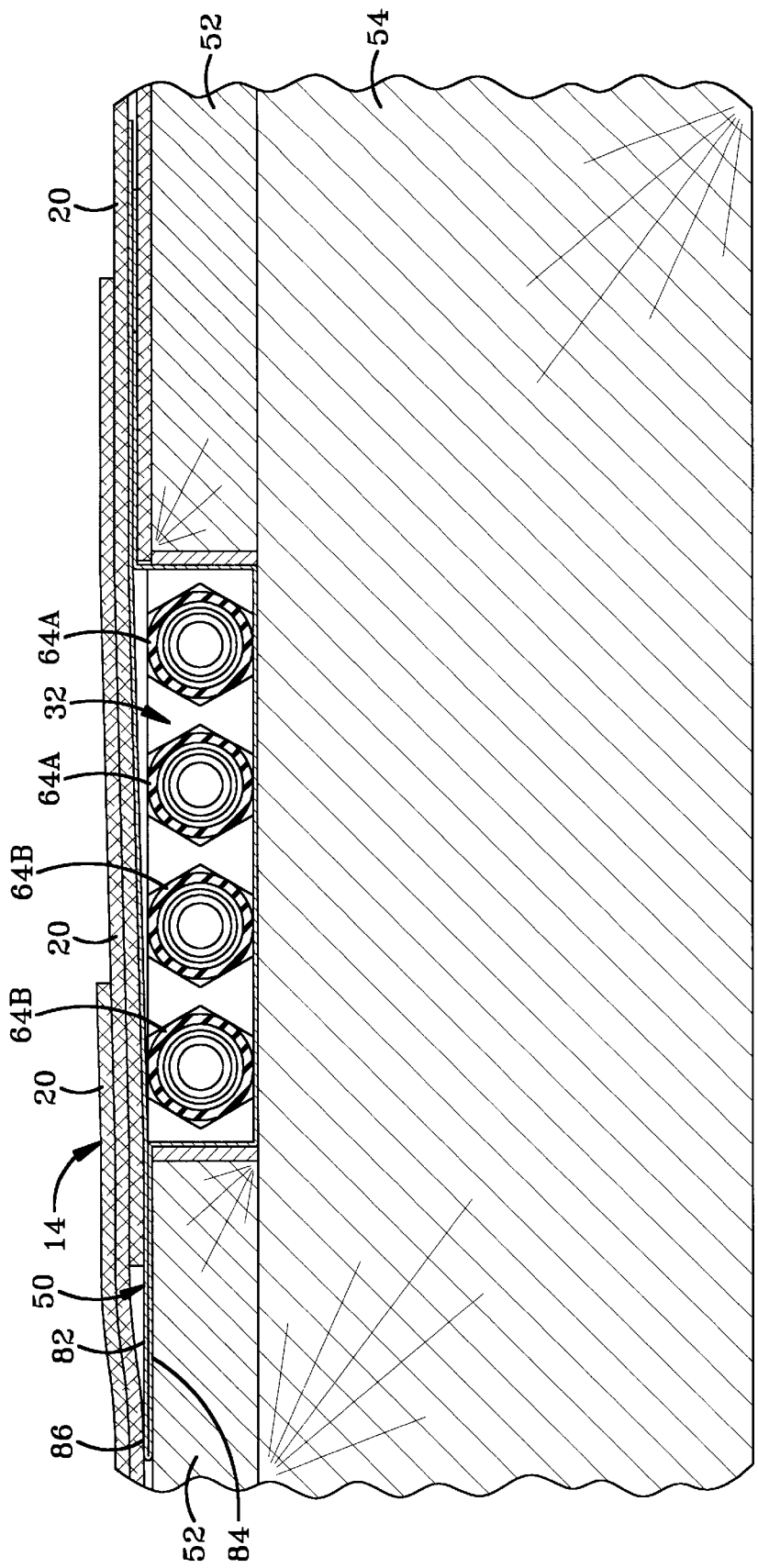
FIG. 6 is a section view taken along line 6—6 of FIG. 4B.
Figure 7:
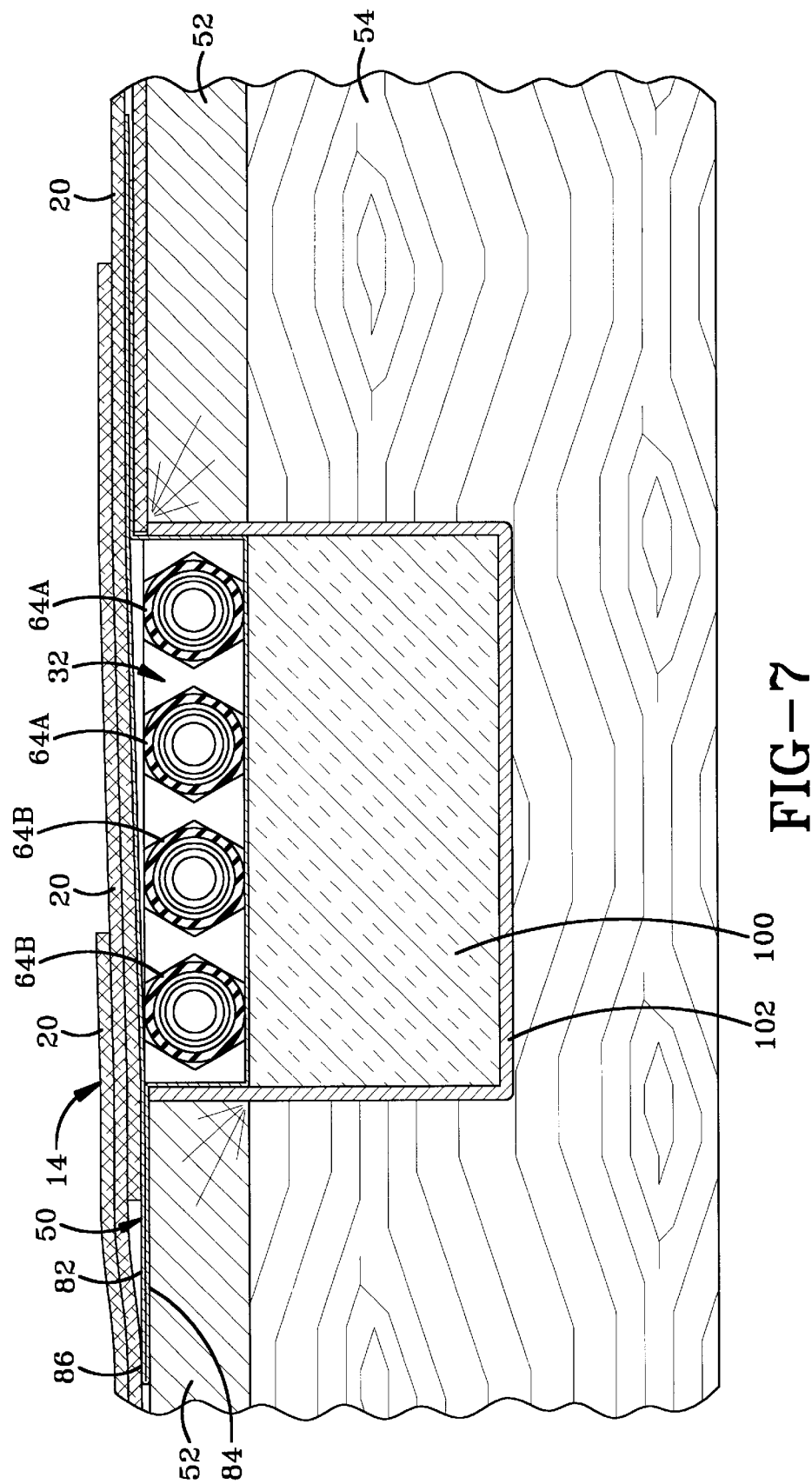
FIG. 7 is a section view taken along line 7—7 of FIG. 4B.

Hinge 86 is configured to allow top member 82 to be bent upwardly away from bottom member 84 so that a connector, such as a nail or screw 88, (FIG. 5) may be driven through bottom member 84 to connect tray 50 to roof 14. Top member 82 covers connector 88 when top member 82 is folded back down to its resting position. In a similar manner, connector 88 may be driven through the lower portion of bottom member 84 to connect tray 50 to roof 14 while being covered by top member 82. Connectors 88 do not create leak risks because they are positioned above water locations, covered by shingles 20, or connectors 88 are driven through a shingle 20 such as with the lower connector.

The end of tray 50 adjacent primary drain conduit 38 includes flange 90 (FIG. 4A) that directs any leaks disposed in tray 50 directly into conduit 38 to prevent the leak from entering roof 14. At the end of tray 50 adjacent return block 62, tray 50 includes a flange 92 that prevents water disposed within tray from leaking out of the end of tray 50. The corners of tray adjacent flange 92 are formed in a manner that prevents water from leaking out through the corners. The corners are folded to prevent any gap from occurring at the corners. Turning back to the end of tray 50 adjacent conduit 38, tray 50 includes flanges 94 that help to position tray 50 with respect to roof 14. Flanges 94 abut against an opening cut in board 52 that provides access to conduit 38 and room for inlet block 60. This opening is preferably positioned immediately adjacent joist 54 so that the weight of inlet block 60 is supported by joist 54. Bottom member 84 is cut out at this location to provide room for inlet block 60. The structure and configuration of tray 50 thus prevents leaks while allowing heat gathering units 32 to be positioned within roof 14 without requiring major structural changes to roof 14.

System 10 may be retrofit into an existing roof 14 by installing at least one heat gathering unit 32 in roof 14. To install heat gathering unit 32, the person installing system 10 must remove a section of shingles 20 and cut an opening in the deck boards 52 of roof 14 slightly larger than the size of heat gathering unit 32. The end of heat gathering unit 32 may be positioned adjacent a roof joist 54 so that inlet block 60 may be supported by the joist 54. Primary drain conduit 38 is then positioned under deck boards 52 from heat gathering unit 32 down to the overhang of roof 14 where primary supply pipe 30 and primary return pipe 34 will be run. Tray 50 of heat gathering unit 32 may then be placed in the opening cut in deck board 52 and attached to roof 14 as described above. The lower portion of tray 50 must be placed over top of shingles 20 as shown in the drawings. Conduit 64 and blocks 60 and 62 are then inserted into tray 50. Top member 82 of tray 50 is then bent downwardly and may be connected to roof 14 with an additional connector. The person installing system 10 then shingles over heat gathering unit 32 in a manner that allows one to see the lower edge of top member 82 so that the location of heat gathering unit 32 may be determined.

Water may then be pumped through system 10. The water will be heated as it travels up through primary supply pipe 30, across and back through heat gathering unit 32, and down primary return pipe 34 when solar radiation strikes building 16. Most of the heat will be gathered as the water moves through heat gathering unit 32 given its location on roof 14 and its proximity to shingles 20.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. An improved solar-powered water heating system adapted to be at least partially mounted to the roof of a structure; the roof having a plurality of joists with a deck material disposed on the joists; the roof including a roof covering disposed over the deck material; the deck material having a thickness; the deck material defining an opening; the heating system including a primary supply pipe and a primary return pipe; the improvement comprising:

a heat gathering unit adapted to be disposed in the opening of the deck material of the roof; the primary supply pipe and the primary return pipe being connected to the heat gathering unit;

the heat gathering unit being disposed in the opening of the deck material;

the heat gathering unit being supported by the joists; and portions of the heat gathering unit extending out from under the roof covering to provide a visual position indicator for the heat gathering unit.

2. The improvement of claim 1, wherein the deck material has a thickness of about ¾ inches.

3. The improvement of claim 2, wherein the heat gathering unit has a lower surface substantially coplanar with the lower surface of the deck material.

4. The improvement of claim 1, wherein the heat gathering unit includes a tray disposed in the opening of the deck material; at least one conduit disposed in the tray; the conduit being adapted to receive water from the primary supply pipe and return water to the primary return pipe; the tray being supported by the joists.

5. The improvement of claim 4, wherein the portion of the tray carrying the conduit is adapted to be disposed under the roof covering; and a portion of the tray extending out from under the roof covering to act as the visual position indicator.

6. An improved solar-powered water heating system adapted to be at least partially mounted to the roof of a structure; the roof having a plurality of joists with a deck material disposed on the joists; the roof including a roof covering disposed over the deck material; the deck material having a thickness; the deck material defining an opening; the heating system including a primary supply pipe and a primary return pipe; the improvement comprising:

a heat gathering unit adapted to be disposed in the opening of the deck material of the roof; the primary supply pipe and the primary return pipe being connected to the heat gathering unit;

the heat gathering unit being disposed in the opening of the deck material;

the heat gathering unit being supported by the joists; and a primary drain conduit adapted to be mounted to the roof under the deck material; portions of the primary supply tube and the primary return pipe being disposed in the primary drain conduit.

7. The improvement of claim 6, wherein the primary drain conduit has an upper end and a lower end; the lower end defining an opening adapted to allow liquid disposed in the primary drain conduit to flow out of the primary drain conduit.

8. The improvement of claim 7, wherein the structure has a wall; the roof overhanging the wall; the opening in the lower end of the primary drain conduit being disposed in the overhanging portion of the roof.

9. The improvement of claim 6, further comprising a supply pump adapted to be connected to a supply of water; the supply pump adapted to deliver the water to the heat gathering unit.

10. The improvement of claim 6, wherein the heat gathering unit includes a tray disposed in the opening of the deck material; at least one conduit disposed in the tray; the conduit being adapted to receive water from the primary supply pipe and return water to the primary return pipe; the tray being supported by the joists.

11. The improvement of claim 10, wherein the portion of the tray carrying the conduit is adapted to be disposed under the roof covering.

12. The improvement of claim 11, wherein the roof covering is a plurality of shingles.

13. The improvement of claim 10, further comprising an insulating material disposed under the tray between the joists.

14. An improved solar-powered water heating system adapted to be at least partially mounted to the roof of a structure; the roof having a plurality of joists with a deck material disposed on the joists; the roof including a roof covering disposed over the deck material; the deck material having a thickness; the deck material defining an opening; the heating system including a primary supply pipe and a primary return pipe; the improvement comprising:

a heat gathering unit adapted to be disposed in the opening of the deck material of the roof; the primary supply pipe and the primary return pipe being connected to the heat gathering unit;

the heat gathering unit being disposed in the opening of the deck material;

the heat gathering unit being supported by the joists;

the heat gathering unit including a tray disposed in the opening of the deck material; at least one conduit disposed in the tray; the conduit being adapted to receive water from the primary supply pipe and return water to the primary return pipe; the tray being supported by the joists; and the tray including a bottom member, a hinge, and a top member; the top member being hingedly connected to the bottom member with the hinge.

15. The improvement of claim 14, wherein the bottom member is adapted to be connected to the deck material with connectors; the top member covering the connectors.

16. The improvement of claim 15, wherein the upper and lower members of the tray have lower edges; the lower edge of the upper member disposed farther down the roof than the lower edge of the bottom member.

17. The improvement of claim 14, wherein the tray is adapted to gather leaks from the conduit.

18. The improvement of claim 17, further comprising a primary drain conduit adapted to be mounted to the roof under the deck material; portions of the primary supply tube and the primary return pipe being disposed in the primary drain conduit; the tray being adapted to dispense leaks from the conduit into the primary drain conduit.

19. The improvement of claim 18, further comprising a primary drain conduit adapted to be mounted to the roof under the deck material; portions of the primary supply tube and the primary return pipe being disposed in the primary drain conduit; the tray being adapted to dispense leaks from the conduit into the primary drain conduit.

20. An improved solar-powered water heating system adapted to be at least partially mounted to the roof of a structure; the roof having a plurality of joists with a deck material disposed on the joists; the roof including a roof covering disposed over the deck material; the deck material having a thickness; the deck material defining an opening; the heating system including a primary supply pipe and a primary return pipe; the improvement comprising:

a heat gathering unit adapted to be disposed in the opening of the deck material of the roof; the primary supply pipe and the primary return pipe being connected to the heat gathering unit;

the heat gathering unit being disposed in the opening of the deck material;

the heat gathering unit being supported by the joists;

the heat gathering unit including a tray disposed in the opening of the deck material; at least one conduit disposed in the tray; the conduit being adapted to receive water from the primary supply pipe and return water to the primary return pipe;

the tray being supported by the joists;

the tray being adapted to gather leaks from the conduit;

the tray having a leak outlet that is adapted to dispense leaks from the conduit over the top of the roof covering.

21. The improvement of claim 20, wherein the tray includes a bottom member, a hinge, and a top member; the top member being hingedly connected to the bottom member with the hinge.

22. An improved solar-powered water heating system adapted to be at least partially mounted to the roof of a structure; the roof having a plurality of joists with each joist having an upper surface; a deck material disposed on the upper surfaces of the joists; the roof including a roof covering disposed over the deck material; the deck material having a thickness; the deck material defining an opening;

the heating system including a primary supply pipe and a primary return pipe; the improvement comprising:

a heat gathering unit adapted to be disposed in the opening of the deck material of the roof; the primary supply pipe and the primary return pipe being connected to the heat gathering unit;

the heat gathering unit being disposed in the opening of the deck material;

the heat gathering unit including a tray that is substantially perpendicular to and supported by the joists;

the tray being disposed under the roof covering;

the tray having a lower surface;

the lower surface of the tray being supported by the upper surfaces of the joists;

the tray disposed in the opening of the deck material;

at least one conduit disposed in the tray; and the conduit being adapted to receive water from the primary supply pipe and return water to the primary return pipe.

23. The improvement of claim 22, further comprising an insulating material disposed under the portion of the tray that holds the conduit.

24. The improvement of claim 22, wherein a portion of the tray extends out from under the roof covering to act as a visual position indicator.

25. The improvement of claim 22, wherein the tray has a leak outlet disposed above the roof covering.

* * * * *